Nov. 28, 1967 T. J. FINN 3,355,542
PREFORMED HELICAL APPLIANCE FOR LINEAR BODIES
Original Filed Oct. 25, 1963 2 Sheets-Sheet 1
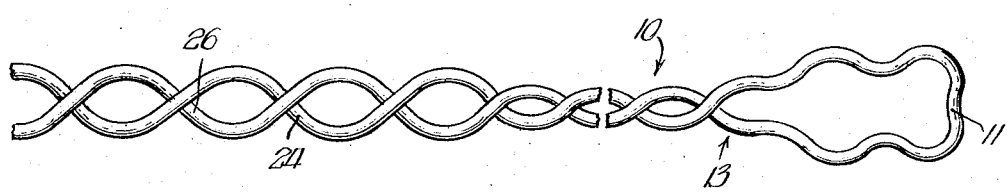
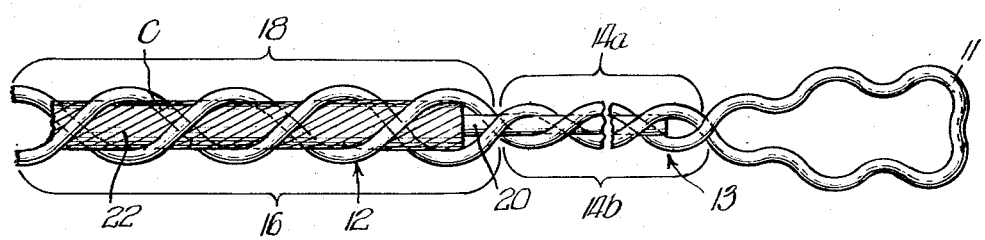
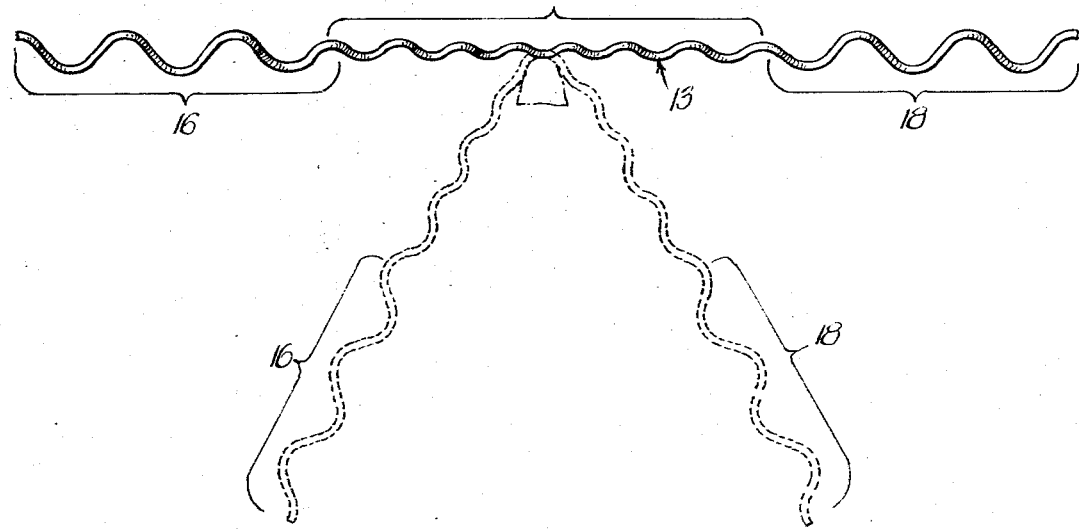
INVENTOR.
Thomas J. Finn,
BY
Byron, Hume, Groen + Clement
Attys.

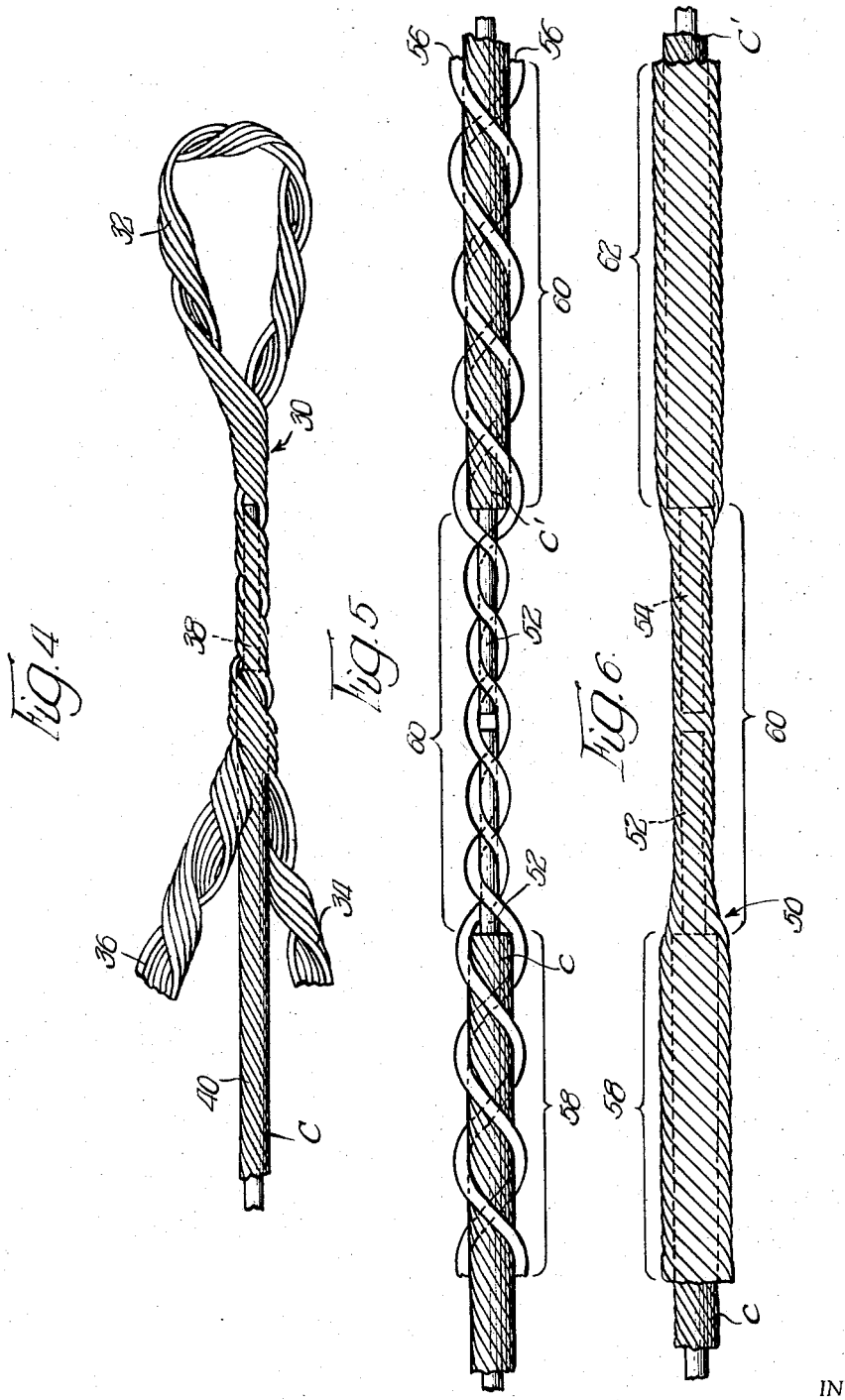

United States Patent Office 3,355,542
Patented Nov. 28, 1967

3,355,542
PREFORMED HELICAL APPLIANCE FOR
LINEAR BODIES
Thomas J. Finn, Cleveland, Ohio, assignor to Preformed
Line Products Company, Cleveland, Ohio, a corporation
of Ohio
Continuation of application Ser. No. 318,972, Oct. 25,
1963. This application Sept. 23, 1966, Ser. No. 581,660
15 Claims. (Cl. 174—79)

ABSTRACT OF THE DISCLOSURE

This invention relates to helically preformed elements particularly suited for use as dead ends, splices and the like, in conjunction with reinforced electrical conductors having a core and an outer layer surrounding the core. In accordance with this invention, the helically preshaped element has a first portion of its length formed to a helical internal diameter selected to be somewhat less than the outer diameter of the core of the reinforced cable to which it is to be applied. The element further includes another portion of its length having an internal helical diameter greater than the said diameter of the first portion by a predetermined ratio which diameter is selected to be somewhat greater than the external diameter of the outer layer of the reinforced cable. The helically preshaped element accordingly is adapted to simultaneously grip the core and the outer portion of a reinforced cable.

---

This application is a continuation of copending application Ser. No. 318,972, filed Oct. 25, 1963, entitled "Appliance for Linear Bodies," now abandoned.

This invention pertains to appliances for linear bodies such as electrical conductors, cables and the like and in particular to appliances especially suited for use in conjunction with reinforced electrical conductors having a core of high tensile strength material and an outer layer of conductive material. The appliances are of the type constructed of one or more helical elements as exemplified by the patents to Peterson, some of which are as follows: 2,275,019, 2,587,521, 2,609,653, 2,691,865, 2,761,275 and 2,959,632.

As mentioned previously, the subject invention is especially suited to be used in conjunction with cables or conductors having reinforcing core. The conductor, in essence, consists of a core or strand of high tensile strength material such as steel and a layer of highly conductive material such as aluminum or copper. The layer of conductive material will generally take the form of a plurality of strands wrapped around the core. The purpose of this arrangement is to obtain the conductive properties of the aluminum and at the same time the high tensile strength of the steel both of which are essential in high voltage systems requiring relatively heavy conductors and where the span lengths are relatively long.

One of the problems encountered in the utilization of reinforced conductors is the ability to adequately grip the conductor for purposes of suspending the same. As shown in the aforementioned Peterson Patent No. 2,761,-273, one of the most successful of the appliances constructed from helically pre-shaped elements is a dead end. A dead end is constructed of one or more of the helical elements which are return bent at their mid-point to form a bight with legs projecting therefrom. The legs are wrapped around the end of the conductor so as to be in tightly gripping encircling relationship therewith. It has been found that with ordinary conductors that it is possible to develop, with a properly sized dead end constructed of helically formed elements having an internal diameter less than the external diameter of the conductor to which it is applied, a gripping strength greater than the breaking strength of the conductor. For this reason the Peterson dead end has enjoyed wide-spread usage and in many instances has replaced the prior art types of dead ends which usually consist of bolted clamps or the like.

One of the problems encountered in using appliances constructed of helically formed elements, as well as other types of appliances, on reinforced conductors is that it is difficult, if not impossible, to obtain a gripping strength approaching its breaking strength. One reason for this is that not enough radial pressure can be exerted on the outer strands for them to grip the core strand to an extent that the strength of the latter is effectively utilized. For this reason the usage of the helically formed appliances on reinforced cable for purposes of holding in tension has been limited.

A foremost feature and object of the subject invention is to provide an appliance constructed of helically pre-shaped elements which are especially suited for usage on reinforced cable or conductors.

A further feature and object of the invention resides in the provision of an appliance constructed of helically formed elements which, when applied to a reinforced conductor, develops a relatively high gripping strength and in fact may develop a gripping strength which is as great or greater than the tensile strength of the conductor.

A still further feature and object of the invention resides in the provision of a method for suspending reinforced conductors by utilizing helically pre-shaped elements which may be formed into various appliances such as dead ends, splices, tap wire hangers and the like.

A further feature and object of the invention resides in the provision of an appliance for use in the suspension of conductors which retains all of the advantages of those constructed from helically pre-shaped elements and at the same time is especially suited for use in conjunction with reinforced conductors.

Briefly the invention may be described as including at least one helically pre-shaped element which for a portion of its length is formed to a first helical internal diameter that is somewhat less than the diameter of the core of the reinforced cable to which it is to be applied. The helically pre-shaped element further includes another portion of its length having an internal helical diameter which is somewhat less than the external diameter of the conductor but greater than that of the first portion. The first portion is adapted to be applied to the core of the cable and since it is of a smaller internal diameter it will tightly grip the the same. The second portion is adapted to be applied to the conductive material and since the internal diameter of the second portion is less than that of the outside diameter of the conductive material it will tightly grip the same. If such an element or elements are utilized in forming a dead end whereby the conductor and the element are under tension when the line is suspended then the gripping strength will be exerted both on the core and the conducting material. The gripping strength of the two portions in summation may be made to be essentially equal to or greater than the breaking strength of the conductor. Furthermore, by gripping both the core and the conductive strands, the helically formed element or elements serve to couple the two so as to prevent any longitudinal shifting due to an uneven distribution of tensile load.

The aforegoing features and objects of the invention will be apparent upon reading of the specification with reference to the following drawings.

In the drawings:

FIGURE 1 is an elevational view of a single element dead end embodying the invention;

FIGURE 2 is an elevational view of such a dead end applied to a reinforced conductor;

FIGURE 3 is an elevational view of a helically formed element which may be used in the construction of the dead end shown in FIGURES 1 and 2;

FIGURE 4 is an elevational view of a dead end constructed of a plurality of helically formed elements and applied to a reinforced conductor;

FIGURE 5 is an elevational view of a splice constructed of a single helical element embodying the invention;

FIGURE 6 is an elevational view of a splice constructed of a plurality of helical elements embodying the invention.

Referring now to FIGURE 1 there is shown one form of the invention which comprises a dead end generally denoted by the numeral 10. The dead end in this instance comprises a single wire or rod-like element 13 which has been helically formed throughout substantially all of its length. The dead end 10 includes a bight portion 11 and a body gripping portion 12.

As shown in FIGURE 3 the helical element 13 comprises a mid-section 14 and two sections 16 and 18 adjacent its respective ends. Throughout the mid-portion 14, the element 12 is helically formed to an internal diameter and pitch length which will permit it to be applied from the side to a linear body such as a conductor without exceeding the elastic limit of either. By "applied from the side" it means to wrap the helical element into an encircling relationship so that the axis of the helix is substantially coaxial with that of the conductor. It can further be seen that the helix throughout the mid-section 14 is of a substantially open pitch to further facilitate the application of the same to the conductor.

The end portions 16 and 18 are likewise helically formed but to a greater internal diameter. The purpose of this is to likewise permit the sections 16 and 18 to be wrapped around a linear body from the side into an encircling relationship in which the linear body is of a substantially greater diameter than that to be associated with the mid-section 14. The sections 16 and 18 are of an open pitch to facilitate the application of the helix to the linear body.

As stated previously, it has been found that by making the internal diameter of the helix somewhat smaller than the external diameter of the line to which it is applied that the former will be forced to resiliently expand in order to accommodate the latter. It has been found that by this method it is possible to construct an appliance, such as a dead end, having excellent gripping properties and in fact where multiple helical elements are used the gripping strength may be greater than the breaking strength of the conductor. Thus, if the helically formed element shown on FIGURE 3 is to be utilized in the construction of a dead end which is normally utilized for supporting a line under tension, the internal diameter of the various sections 14, 16 and 18 will preferably be less than the diameter of the conductor or portion thereof to which they are applied.

Referring now to FIGURE 2, there is shown the inventive combination including a reinforced conductor C. The conductor C includes a core or strand 20 which is normally constructed of a high tensile strength material such as steel. An outer layer of strands 22 of conductive material such as aluminum or copper is wrapped around the core 20. As mentioned previously, the purpose of the combination of core 20 and strands 22 is to enhance the tensile strength of the conductor C and at the same time retain the conductive qualities of the jacket material. It will be noted that in some instances the core 20 may be the conductive material and the strands 22 are the reinforcement. As will be seen later on the underlying concepts of the invention are the same regardless of the orientation of conductive material to reinforcement material.

Adjacent the end of the conductor C the core 20 extends beyond the strands 22. This may be accomplished by simply removing the strands adjacent the end or by any other convenient means. As shown in the drawing, the dead end 10 is applied by wrapping the legs 24 and 26 around the conductor C.

As can be seen from FIGURE 3, the dead end is formed by bending the helically formed element 13 about its mid-point, which is also the mid-point of the section 14. This bending forms the bight 11 having the leg members 24 and 26 extending therefrom, which constitutes the body gripping portion 12 of the dead end. Generally the bend is made so that the leg members 24 and 26 are 180° out of phase so that when intertwisted they are diametrically opposed to each other in any right section, as can be seen in FIGURE 1.

Each leg member includes a portion 14a, 14b of the mid-section 14 which is of the smaller internal helical diameter and one of the sections 16 or 18 of the larger internal helical diameter.

Referring back to FIGURE 2 it can be seen that each leg is wrapped around the conductor C in an encircling relationship. The portions 14a and 14b of the legs having the smaller internal diameter are wrapped around the conductor core 20. The remaining portions of the legs, that is sections 16 and 18, which are of the larger helical diameter are wrapped around the stranded portion of the conductor adjacent to the exposed core portion 20. Since the internal diameter of the leg portions 14a, 14b applied to the core 20 is materially smaller than the external diameter of the latter, then there will be a tightly gripping relationship between the two. The same is also true with respect to portions of the legs which are applied to the stranded outer layer portion of the conductor C.

Referring now to FIGURE 4 there is shown a dead end 30, constructed in accordance with the invention, from a plurality of helical elements. Each of the helical elements are substantially the same as the individual elements shown in FIGURES 1 through 3. As shown in FIGURE 4 the dead end 30 includes a bight portion 32 and legs 34 and 36. The legs are of opposite phase relationship so that when wrapped on the conductor they substantially cover the same. Each of the legs 34, 36 is wrapped for a part of its length around the core 38 and for the remainder of its length around the adjoining covered portion of the conductor. As a matter of fact if the legs are inter-twisted without the conductor they would form a self supporting tubular envelope. The additional elements obviously enhance the gripping strength of the dead end and facilitate the development of a gripping strength equal to the rated breaking strength to the conductor. In most installations the dead end will consist of a full complement of the helical elements in the body gripping portion.

The operation, application and charateristics of the multiple helical element dead end are substantially the same as previously discussed with regard to the single element dead end. The only difference being the enhancement of the gripping strength by the addition of helical elements.

The ratio of the lengths between the smaller internal diameter portion and the larger internal diameter portion depends upon the characteristics of the conductor and its parts. For example, one commonly used form of reinforced conductor has a core having approximately 50 percent of the rated breaking strength of the conductor with the remaining strength being in the aluminum strands covering the core. Thus when the dead end is to be applied to such a conductor the lengths of the core and the stranded portion covered by the helical elements are approximately equal. In any event, where it is desired that the dead end grip the conductor with a force equal to its breaking strength, the lengths of the helical elements respectively applied to the core and adjacent stranded portion are sufficient to develop a gripping force at least equal to the breaking strength of the associated part of the conductor. In other words the dead end will grip the core with a force equal to its breaking strength and the stranded outer layer with a force equal to its breaking strength. Thus the summation of the gripping forces will be at least equal to the conductor's total breaking strength. The specific lengths necessary to develop a gripping force equal to the rated breaking strength of the conductor are well known to those skilled in the art. It will be further noted that generally when the internal diameter is reduced the pitch length will likewise be reduced.

The ratio of the internal diameters of the two sections of the dead ends will be of approximately the same magnitude as the ratio of diameters of the overall cable to its core. For example, if the ratio of the outside diameter to the core is three to one then the ratio of internal diameters will be approximately three to one.

Referring now to FIGURE 5 there is shown a splice constructed in accordance with the principles of the invention generally denoted by the numeral 50. The splice is used in the joining of two reinforced conductors C and C¹. Each of the conductors consists of a core 52 and overlying strands 54. The splice 50 consists of a plurality of helically formed rods which are applied to the conductors for purposes of both mechanically and electrically joining the same. In such a splice it is desirable that the gripping strength between the splice and the conductors be substantially equal to or even greater than the rated breaking strength of the conductor.

For purposes of illustration in FIGURE 6 there is shown two elements 56 of the type utilized in the construction of the splice 50. The elements 56 are helically formed throughout their lengths and consist of three sections 58, 60 and 62. The mid-section 60 is of a substantially smaller internal helical diameter and pitch length than the sections 58 and 62. The section 60 is designed to be wrapped around the exposed core portions of the conductor C and C¹. The sections 58 and 62 are designed to be wrapped around the aluminum strand portions of the conductor C and C¹. The same principles apply to the ratios of the lengths of the large and small diameter portions and the ratios of their diameters as set forth previously with regard to the dead end.

It will be noted that the splice may be used for joining conductors of two different sizes. For example, if conductor C were larger than conductor C¹ then section 58 would have a larger internal diameter than section 62. In such a situation the respective cores 52 and 54 of the conductors would undoubtedly be different in size so that it would be necessary to divide the mid-section into two parts in which that adjacent the section 58 would be designed to grip the core of the conductor associated therewith and the remaining portion of section 60 being adapted to grip the core of the conductor associated with the section 62.

While the invention has been described in terms of two specific appliances, namely dead ends and splices, it is to be understood that this is merely by way of example. The specific invention may be utilized wherever the helical elements are to be utilized for supporting a suspended reinforced cable in tension and particularly where it is necessary to develop a gripping strength approximating the rated breaking strength of the conductor. It will be apparent to those skilled in the art that certain modifications may be made without departing from the spirit of the invention.

What is claimed is:

1. A dead end comprising a cable having a core and an outer layer around said core, said cable having said outer layer removed therefrom for a portion of its length adjacent its end so as to expose said core, a helically pre-shaped element having a first section intermediate its ends and other sections adjacent its ends, said first section having an internal helical diameter less than the diameter of said core, said other sections having internal helical diameters less than the external diameter of said outer layer but greater than that of said first section, said element being bent adjacent the midpoint of said first section so as to form a bight having legs projecting therefrom, each of said legs being wrapped around said cable in which the leg portions of the first section are coincident with and in gripping relationship with said exposed core and said other sections are coincidental with and in gripping relationship with the adjoining part of the cable having the outer layer thereon.

2. A dead end on a cable having a core of one material and an outer layer of another material, comprising at least one helically pre-shaped element having a first section intermediate its ends and other sections adjacent its ends, said first section having an internal helical diameter less than the diameter of said core, said other sections having an internal helical diameter less than the external diameter of said outer layer but greater than that of said first section, said element being return bent adjacent the mid-point of said first section so as to form a bight having legs projecting therefrom in which each of said legs are composed of a portion of said first section and one of said other sections, each of said legs being wrapped in encircling relationship with said conductor in which said portion grips said core and said one of said other sections grips said outer layer.

3. A dead end on a conductor having a core and an outer layer around said core comprising a plurality of helically pre-shaped elements of mutually conforming pitch and internal diameter, each of said helically pre-shaped elements having a first section intermediate its ends and other sections adjacent its ends, said first section having an internal helical diameter less than the diameter of said core, said other sections having an internal helical diameter less than the external diameter of said outer layer but greater than that of said first section, said elements being inter-twisted and being return bent adjacent the mid-point of said first section so as to form a bight having legs projecting therefrom in which each of said legs are composed of a portion of said first section and one of said other sections, each of said legs being wrapped in encircling relationship with said conductor in which said portion grips said core and said one of said other sections grips said outer layer.

4. An appliance on a conductor having a core of high tensile strength material and an outer layer of a conductive material comprising a plurality of helically pre-shaped elements having mutually conforming pitch length and internal diameter, each of said elements having a first section intermediate its ends and other sections adjacent its ends, said first section having an internal helical diameter less than the diameter of said core, said other sections having an internal helical diameter less than the external diameter of said outer layer but greater than that of said first section, said elements being intertwisted and return bent adjacent their mid-points of said first section so as to form a bight having legs projecting therefrom in which each of said legs are composed of a portion of said first section and one of said other sections, each of said legs being wrapped in encircling relationship with said conductor in which said portion grips said core and said one of said other sections grips said outer layer.

5. The combination comprising two conductors in a coaxial substantially abutting end to end relationship in which the conductors are of the reinforced type having a core and an outer layer around said core, the cores of both conductors being exposed adjacent their substantially abutting ends, a plurality of helically pre-shaped elements of mutually conforming pitch length and internal diameter, each of said helically pre-shaped elements having a first section intermediate its ends and other sections adjacent its ends, said first section having an internal helical diameter less than said core, said other sections having internal helical diameters less than the outside diameter of said outer layer, said first section being wrapped around said cores in a tightly gripping relationship, said other sections being wrapped around said outer layers adjacent said exposed cores in a tightly gripping relationship.

6. The invention comprising two conductors in a coaxial substantially abutting end to end relationship in which the conductors are of the reinforced type having a core of a high tensile strength material and an outer layer of a conductive material, the cores of said conductors being exposed adjacent said substantially abutting ends, and a plurality of helically pre-shaped elements having mutually conforming pitch lengths and internal diameters, each of said helically pre-shaped elements having a first section intermediate its ends and other sections adjacent its ends, said first section having an internal helical diameter less than said core, said other sections having internal helical diameter less than the outer layer of said conductors, said first sections of said plurality of said pre-shaped elements being wrapped around said cores in a tightly gripping relationship and exerting a gripping force thereon at least as great as the breaking strength of said cores, said other sections of said plurality of pre-shaped elements being wrapped around said outer layers of said conductors adjacent said exposed cores in a tightly gripping relationship and exerting a gripping force thereon at least as great as the breaking strength of said outer layer whereby the total gripping force exerted by all of said plurality of helically pre-shaped elements on either one of said conductors is at least as great as the total breaking strength of the conductor.

7. The invention as defined in claim 6 in which the ratio of the internal helical diameters of said other sections to that of said first section is substantially equal to the ratio of the diameters of said outer layer to that of said cores.

8. The sub-combination comprising a cable having a core and an outer layer, at least one helically pre-shaped element having a first longitudinal section and a second longitudinal section, said first longitudinal section having an internal helical diameter less than the diameter of said core, said second longitudinal section having an internal helical diameter less than the diameter of said outer layer but greater than the internal diameter of said first longitudinal section, said first longitudinal section being wrapped around said core in gripping relation therewith and said second section being wrapped around and in gripping relationship with said outer layer.

9. The sub-combination comprising a cable having a core and an outer layer, said core projecting axially beyond said outer layer at one end of said cable, at least one helically pre-shaped element having a first longitudinal section and a second longitudinal section, said first longitudinal section having an internal helical diameter less than the diameter of said core, said second longitudinal section having an internal diameter less than the diameter of said outer layer but greater than the internal diameter of said first section, said first longitudinal section being wrapped around said core in gripping relationship therewith and exerting a gripping force on said core at least as great as the breaking strength of said core, said second longitudinal section being wrapped around said outer layer in gripping relationship therewith and exerting a gripping force on said outer layer at least as great as the breaking strength of said outer layer.

10. The combination comprising two conductors in coaxial end to end relationship in which the conductors are of the reinforced type having a core and an outer layer around the core, the cores of both conductors being exposed at adjacent ends, a helically pre-shaped element having an intermediate helical section between its ends and other helical sections adjacent its ends, said intermediate section including a helical portion having an internal helical diameter less than the outside diameter of each of said cores, said other sections having internal helical diameters less than the outside diameter of said outer layers, said intermediate section being wrapped around said exposed cores in a tightly gripping relationship, and said other sections being wrapped around said outer layers adjacent said cores in a tightly gripping relationship.

11. The invention according to claim 10 wherein said intermediate helical section tightly grips said cores and exerts a gripping force thereon at least as great as the breaking strength of said cores, and wherein said other helical sections tightly grip said outer layers and exert a gripping force at least as great as the breaking strength of said outer layers, whereby the total gripping force exerted by said helically pre-shaped element on either one of said conductors is at least as great as the total breaking strength of the conductor.

12. The invention in accordance with claim 10 wherein said outside diameters of said outer layer and core of one conductor are smaller than the corresponding outside diameters of said other conductor.

13. The invention in accordance with claim 10 wherein the ratio of the internal helical diameters of said other sections to said intermediate section is substantially equal to the ratio of the diameters of said outer layers to that of said cores.

14. A dead end for use on a cable having a core and an outer layer around the core comprising at least one helically pre-shaped element having a first helical section intermediate its ends and other helical sections adjacent its ends, said other helical sections having substantially the same preshaped internal helical diameter and said first helical section having a preshaped internal helical diameter which is less than said diameter of said other sections by a pre-determined ratio, said element being return bent adjacent the mid-point of said first helical section to form a bight having legs projecting therefrom, said legs being inter-twisted to define a cable gripping portion composed of a length of said first helical section and one of said other helical sections, said other helical sections and said length of said first helical section defining said cable gripping portions of said legs being preshaped with an open helical pitch which permits said cable gripping portions to be coaxially aligned and intertwisted with each other for wrapping said portions in encircling coaxial relationship about said cable to grip said core with said first helical section and grip said outer layer with said other helical sections of said dead end.

15. A dead end for use on a cable having a core and an outer layer around the core comprising a plurality of helically pre-shaped elements of mutually conforming pitch and internal diameter, each of said helically preshaped elements having a first helical section intermediate its ends and other helical sections adjacent its ends, said other helical sections having substantially the same pre-shaped internal helical diameter and said first helical section having a preshaped internal helical diameter which is less than said diameter of said other sections by a predetermined ratio, said elements being inter-twisted and being return bent adjacent the mid-point of said first sections to form a bight having legs projecting therefrom, said legs being inter-twisted to define a cable gripping portion composed of a length of said first helical section and one of said other helical sections of said elements, said other helical sections and said length of said first helical section defining said cable gripping portions of said legs being preshaped with an open helical pitch which permits said cable gripping portions to be coaxially aligned and intertwisted with each other for wrapping said portions in encircling coaxial relationship about said cable to grip said core with said first helical sections and grip said outer layer with said other helical sections of said dead end.

References Cited

UNITED STATES PATENTS 2,761,273  9/1956  Peterson.
3,183,658  5/1965  Peterson _____ 174—79 X DARRELL L. CLAY, *Primary Examiner.*

LEWIS H. MYERS, *Examiner.*

UNITED STATES PATENT OFFICE
CERTIFICATE OF CORRECTION

Patent No. 3,355,542 November 28, 1967

Thomas J. Finn

It is hereby certified that error appears in the above numbered patent requiring correction and that the said Letters Patent should read as corrected below.

Column 1, line 26, for "greater" read -- less --.

Signed and sealed this 15th day of April 1969.

(SEAL)
Attest:

Edward M. Fletcher, Jr.
Attesting Officer

EDWARD J. BRENNER
Commissioner of Patents